United States Patent [19]

Karrer

[11] 4,444,928

[45] Apr. 24, 1984

[54] POLYMERIC MALONIC ACID DERIVATIVES

[75] Inventor: Friedrich Karrer, Zofingen, Switzerland

[73] Assignee: Ciba-Geigy Corporation, Ardsley, N.Y.

[21] Appl. No.: 405,114

[22] Filed: Aug. 4, 1982

[30] Foreign Application Priority Data

Aug. 14, 1981 [CH] Switzerland ............... 5264/81

[51] Int. Cl.³ ............ C08K 5/34; C07D 211/30; C07D 211/36; C07D 401/00

[52] U.S. Cl. .................... 524/99; 524/102; 524/103; 524/105; 524/106; 546/187; 546/188; 546/190; 546/191; 546/210; 546/216; 546/219; 546/220; 546/222; 546/223; 546/224; 546/225; 546/227; 546/230; 546/238

[58] Field of Search ............... 524/99, 102, 103, 105, 524/106; 546/187, 190, 210, 216, 224, 225, 227, 230, 238, 186, 188, 220, 222, 223, 528/289

[56] References Cited

U.S. PATENT DOCUMENTS

| | | | |
|---|---|---|---|
| 4,210,577 | 7/1980 | Minagawa et al. | 260/45.8 NT |
| 4,233,412 | 11/1980 | Rody et al. | 525/167 |
| 4,238,613 | 12/1980 | Rasberger et al. | 546/190 |
| 4,293,468 | 10/1981 | Rody | 260/45.8 |
| 4,344,876 | 8/1982 | Berner | 524/91 |
| 4,371,695 | 2/1983 | Di Battista et al. | 546/190 |

Primary Examiner—John Kight, III
Assistant Examiner—Kriellion Morgan
Attorney, Agent, or Firm—Harry Falber

[57] ABSTRACT

Polymers or oligometic compounds of the general formula

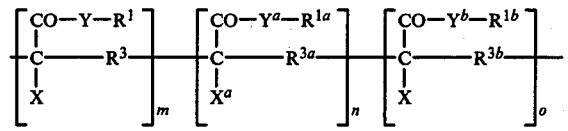

in which $X$, $X^a$ and $X^b$ are an ester, amide or cyano group, $Y$, $Y^a$ and $Y^b$ are $-O-$ or $-NR^{10}-$, $R^1$, $R^{1a}$ and $R^{1b}$ are a group which contains a polyalkylpiperidine radical, and $R^{1a}$ can also be alkyl, and $R^3$, $R^{3a}$ and $R^{3b}$ are alkylene, alkenylene, arylene-dialkylene, cycloalkylene-dialkylene or monooxa-alkylene or polyoxa-alkylene, can be prepared by the polycondensation of malonic acid esters or amides or cyanoacetic acid esters or amides with difunctional compounds, preferably dihalogen compounds, in the presence of bases. The products obtained have a molecular weight of 800 to 20,000 and are outstanding light stabilizers for organic polymers.

4 Claims, No Drawings

POLYMERIC MALONIC ACID DERIVATIVES

The invention relates to polyalkylpiperidine derivatives of polymeric or oligomeric malonic acids, which are light stabilisers for organic polymers, and also to the polymers stabilised with these compounds.

It is known that sterically hindered 2,2,6,6-tetraalkylpiperidines and their derivatives are excellent light stabilisers for organic materials, in particular for organic polymers. Polyalkylpiperidinyl esters of substituted malonic acids, for example of dibenzylmalonic acid, have also already been proposed as light stabilizers (German Offenlegungsschrift No. 2,718,458). Corresponding esters of substituted cyanoacetic acids, for example of dibenzylcyanoacetic acid, have been proposed in German Offenlegungsschrift No. 2,755,340.

It is furthermore known that such polyalkylpiperidine light stabilisers lose their action as a result of migration or extraction from the substrate to be stabilised, and attempts have been made to extend the period of action of such light stabilisers by increasing their molecular weight. Malonic acid derivatives of these polymeric or oligomeric piperidine light stabilisers have also already been disclosed. Thus, for example, Example 15 of German Offenlegungsschrift No. 2,719,131 describes the preparation of a polyester of the formula

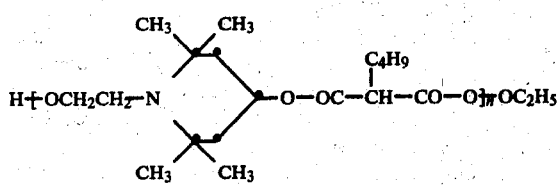

which is then converted to a polyester of the formula

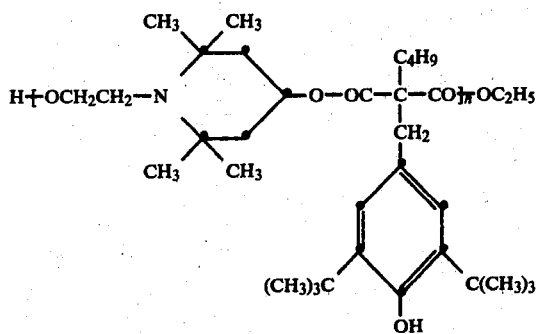

by reaction with N-(3,5-di-tert.-butyl-4-hydroxybenzyl)dimethylamine.

Such polyesters are outstanding stabilisers which have a long-lasting stabilising action provided they are not subjected to the effects of hydrolysis. Under conditions of hydrolysis, however, they are rapidly degraded to give low-molecular fragments, which no longer have the said advantages of the polymeric light stabilisers.

The object of the present invention was therefore to find polymeric or oligomeric polyalkylpiperidine derivatives of malonic acids, which are insensitive or less sensitive to hydrolysis. It has been found that polymalonic acid derivatives can be prepared, of which the main polymer chain does not contain any hydrolysable groups, of which the side chains cannot easily be hydrolysed, and which constitute excellent light stabilisers for organic polymers.

The invention therefore relates to polymers or oligomeric compounds of the general formula I

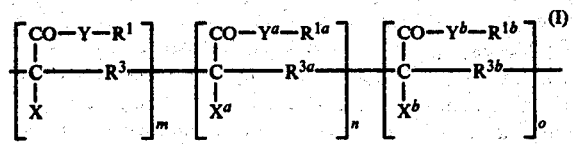

and their salts, in which X is $-CO-Y-R^2$ or $-CN$, $X^a$ is $-CO-Y^a-R^{2a}$ or $-CN$, and $X^b$ is $-CO-Y^b-R^{2b}$ or $-CN$, Y, $Y^a$ and $Y^b$ independently of one another are $-O-$ or $-NR^{10}-$, $R^1$, $R^{1a}$ and $R^{1b}$ independently of one another are a group of the formulae II, III, IV, V or VI

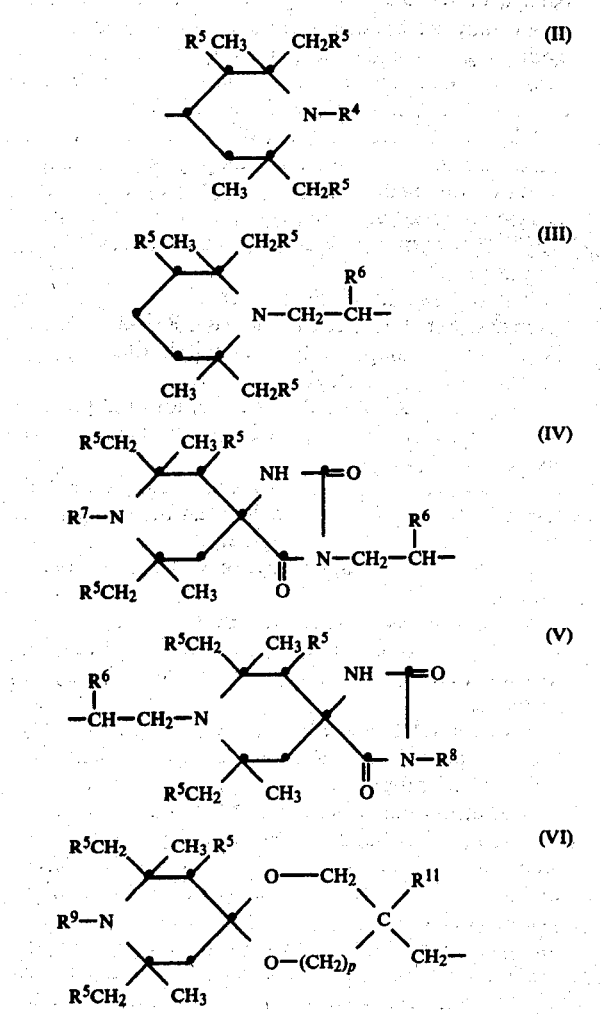

and $R^{1a}$ is also $C_1-C_{18}$-alkyl, $R^2$ is identical to $R^1$ or is H, $C_1-C_{18}$-alkyl, $C_3-C_7$-alkenyl or $C_7-C_{11}$-aralkyl, $R^{2a}$ is identical to $R^{1a}$ or is H, $C_1-C_{18}$-alkyl, $C_3-C_7$-alkenyl or $C_7-C_{11}$-aralkyl, and $R^{2b}$ is identical to $R^{1b}$ or is H, $C_1-C_{18}$-alkyl, $C_3-C_7$-alkenyl or $C_7-C_{11}$-aralkyl, $R^3$, $R^{3a}$ and $R^{3b}$ independently of one another are $C_2-C_{36}$-alkylene, $C_4-C_{18}$-alkenylene, $C_8-C_{20}$-arylene-dialkylene, $C_8-C_{12}$-cycloalkylenedialkylene or $C_4-C_{20}$-monooxaalkylene or polyoxa-alkylene, $R^4$ is hydrogen, $C_1-C_{18}$-alkyl, $C_3-C_{18}$-alkenyl, $C_3-C_5$-alkynyl, $C_2-C_{18}$-alkanoyl, $C_3$–$C_5$-alkenoyl, benzoyl, unsubstituted or $C_1$–$C_4$-alkyl-substituted $C_7$–$C_{11}$-aralkyl, cyanomethyl, a group —$CH_2$—$CH(OH)$—$R^6$, OH, O.(oxyl oxygen), —$COOC_1$–$C_4$-alkyl or —$CON(R^{12})(R^{13})$, $R^5$ is hydrogen or $C_1$–$C_4$-alkyl, $R^6$ is hydrogen, $C_1$–$C_4$-alkyl, phenyl, $C_1$–$C_4$-alkoxy-methyl, phenoxymethyl or $C_1$–$C_4$-alkyl-phenoxymethyl, $R^7$ is hydrogen, $C_1$–$C_{18}$-alkyl, $C_3$–$C_{18}$-alkenyl, $C_3$–$C_5$-alkynyl, $C_2$–$C_{18}$-alkanoyl, $C_3$–$C_5$-alkenoyl, unsubstituted or $C_1$–$C_4$-alkyl-substituted $C_7$–$C_{11}$-aralkyl, O. or cyanomethyl, $R^8$ is $C_1$–$C_{18}$-alkyl, $C_3$–$C_{18}$-alkenyl, $C_3$–$C_5$-alkynyl or $C_7$–$C_{11}$-aralkyl, $R^9$ has one of the definitions given for $R^7$, $R^{10}$ is hydrogen, $C_1$–$C_{18}$-alkyl, $C_3$–$C_{12}$-alkenyl, cyclohexyl or unsubstituted or $C_1$–$C_4$-alkyl-substituted $C_7$–$C_{11}$-aralkyl or $C_6$–$C_{12}$-aryl, $R^{11}$ is hydrogen or $C_2$–$C_4$-alkyl, $R^{12}$ is $C_1$–$C_{12}$-alkyl, $C_3$–$C_5$-alkenyl, $C_5$–$C_8$-cycloalkyl, phenyl or benzyl, and $R^{13}$ is hydrogen, $C_1$–$C_{12}$-alkyl, $C_3$–$C_5$-alkenyl, $C_5$–$C_8$-cycloalkyl or benzyl, or $R^{12}$ and $R^{13}$, together with the N atom to which they are bonded, form a 5–7-membered heterocyclic ring, m, n and o independently of one another are zero or a number from 1 to about 100, the sum of m+n+o being at least 3, and p is zero or 1.

Alkyl $R^2$, $R^{2a}$, $R^{2b}$, $R^4$, $R^6$, $R^7$, $R^8$, $R^9$, $R^{10}$ and $R^{11}$ can be unbranched or branched alkyl groups. Examples of these are methyl, ethyl, propyl, isopropyl, butyl, sec.-butyl, tert.-butyl, isopentyl, n-hexyl, n-octyl, 2-ethylhexyl, n-decyl, n-dodecyl, n-hexadecyl or n-octadecyl.

Within the limits of the number of C atoms defined, alkenyl $R^2$, $R^{2a}$, $R^{2b}$, $R^4$, $R^7$, $R^8$, $R^9$, $R^{10}$, $R^{12}$ and $R^{13}$ can be, for example, allyl, methallyl, dimethylallyl, hexenyl, decenyl or oleyl.

Alkynyl $R^4$, $R^7$, $R^8$ and $R^9$ can be, for example, propargyl, but-2-yn-1-yl or pent-2-yn-1-yl. The preferred alkynyl is propargyl.

Unsubstituted or lower alkyl-substituted aralkyl $R^2$, $R^{2a}$, $R^{2b}$, $R^4$, $R^7$, $R^8$, $R^9$ and $R^{10}$ can be, for example, benzyl, phenylethyl, phenylbutyl, naphthylmethyl, tolylmethyl, 4-tert.-butylbenzyl or xylylmethyl. Benzyl is preferred.

Alkanoyl or alkenoyl $R^4$, $R^7$ and $R^9$ can be, for example, acetyl, propionyl, butyroyl, acryloyl, methacryloyl, hexanoyl, lauroyl or stearoyl. Acetyl and acryloyl are preferred.

Alkylene $R^3$, $R^{3a}$ and $R^{3b}$ can be, for example, ethylene, 1,3-propylene, 1,4-butylene, 1,6-hexylene, 2,2-dimethyl-1,3-propylene, 1,8-octylene, 1,12-dodecylene or 1,20-eicosylene. Alkenylene $R^3$, $R^{3a}$ and $R^{3b}$ can be, for example, 1,4-but-2-enylene, 2-methyl-1,4-but-2-enylene, 1,6-hex-3-enylene or 1,8-oct-2-enylene. Arylene-dialkylene or cycloalkylene-dialkylene $R^3$, $R^{3a}$ and $R^{3b}$ can be, for example, xylylene (phenylene-dimethylene), phenylene-diethylene, diphenyl-4,4'-dimethylene, naphthalene-1,4-dimethylene, cyclohexane-1,4-dimethylene or 2-methylcyclohexane-1,4-dimethylene. Monooxaalkylene or polyoxaalkylene $R^3$, $R^{3a}$ and $R^{3b}$ can be, for example, 3-oxa-1,5-pentylene, 3,6-dioxa-1,8-octylene or 3,8-dioxa-1,10-decylene. $R^3$, $R^{3a}$ and $R^{3b}$ are preferably $C_6$–$C_{12}$-alkylene, butenylene, xylylene or cyclohexane-1,4-dimethylene.

The radical —$N(R^{12})(R^{13})$ can be a primary or secondary, open-chain or cyclic amino radical, for example dimethylamino, butylamino, diethylamino, dibutylamino, dodecylamino, anilino, cyclohexylamino, methyl-cyclohexylamino, benzylamino, butyl-benzylamino, dibenzylamino, piperidino or morpholino.

If the radicals $R^4$, $R^7$ and $R^9$ are not acyl radicals, the compounds of the formula I are capable of forming salts with acids. Examples of acids suitable for this purpose are hydrochloric acid, phosphoric acid, methanesulfonic acid or phenylphosphonic acid. If the radicals X, $X^a$ or $X^b$ are —COOH, the compounds of the formula I can also form salts with bases. Examples of these are, in particular, the alkali metal salts.

The preferred compounds of the formula I are those in which m and n are zero or a number from 1 to 30 and o is zero, the sum of m+n being at least 3, X is —CO—Y—$R^2$ and $X^a$ is —CO—$Y^a$—$R^{2a}$, Y and $Y^a$ are —O— or —$NR^{10}$—, $R^1$ and $R^{1a}$ are a group of the formula II, III, IV or V, $R^2$ is identical to $R^1$ or is $C_1$–$C_6$-alkyl, and $R^{2a}$ is identical to $R^{1a}$ or is $C_1$–$C_6$-alkyl, $R^3$ and $R^{3a}$ are $C_2$–$C_{18}$-alkylene, $C_4$–$C_{12}$-alkenylene, $C_8$–$C_{17}$-arylene-dialkylene, $C_8$–$C_{10}$-cycloalkylene-dialkylene or $C_4$–$C_8$-monooxaalkylene or $C_4$–$C_8$-polyoxaalkylene, $R^4$ is hydrogen, $C_1$–$C_6$-alkyl, $C_3$–$C_5$-alkenyl, propargyl, $C_2$–$C_5$-alkanoyl, $C_3$–$C_5$-alkenoyl or $C_7$–$C_{11}$-aralkyl, $R^5$ is hydrogen, $R^6$ is hydrogen, $C_1$–$C_2$-alkyl, phenyl or phenoxymethyl, $R^7$ has one of the definitions given for $R^4$, $R^8$ is $C_1$–$C_{12}$-alkyl, $C_3$–$C_5$-alkenyl or $C_7$–$C_{11}$-aralkyl, $R^9$ has one of the definitions given for $R^4$, and $R^{10}$ is hydrogen, $C_1$–$C_{12}$-alkyl, benzyl or cyclohexyl.

Particularly preferred compounds of the formula I are those in which m is 3–20, n and o are zero, X is —CO—Y—$R^2$ and Y is —O— or —$NR^{10}$—, $R^1$ and $R^2$ are a group of the formula II, $R^3$ is $C_6$–$C_{12}$-alkylene, 1,4-but-2-enylene, xylylene or cyclohexane-1,4-dimethylene, $R^4$ is hydrogen, $C_1$–$C_4$-alkyl, allyl, benzyl or acetyl, $R^5$ is hydrogen and $R^{10}$ is hydrogen, $C_1$–$C_{12}$-alkyl, benzyl or cyclohexyl.

The compounds of the formula I can be prepared by the polycondensation of malonic acid derivatives of the formula VII with difunctional compounds of the formula VIII, in the presence of at least stoichiometric amounts of a base:

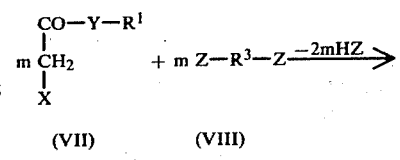

(VII)  (VIII)

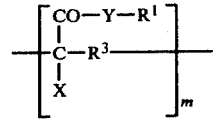

Z is a nucleophilic leaving group, preferably halogen. Examples of difunctional compounds of the formula VIII are: ethylene dibromide, ethylene diiodide, 1,6-dibromohexane, 1,8-dibromooctane, 1,12-di-(p-toluenesulfonyloxy)-dodecane, 1,12-dibromododecane, 1,4-dichlorobut-2-ene, m-xylylene dichloride, p-xylylene dichloride, di-(2-chloroethyl)ether, 1,4-di-(bromomethyl)-cyclohexane or 1,4-di-(2-chloroethyl)-benzene.

The preferred aliphatic dihalides are those which have more than 5 C atoms in the chain between the halogen atoms. This is in order to avoid side-reactions (the formation of cyclic malonic acid ester compounds) as much as possible during the polycondensation.

In the case of the above equation, only one compound of the formula VII and only one compound of the formula VIII are reacted, so that a homopolymeric compound of the formula I is formed in which n and o are zero. However, it is also possible to use a mixture of several different compounds of the formula VII or several different compounds of the formula VIII, in which case copolymeric compounds of the formula I are obtained which have different substituents X, $X^a$, $X^b$ or $-Y-R^1$, $-Y^a-R^{1a}$, $-Y^b-R^{1b}$, or different linkages $R^3$, $R^{3a}$, $R^{3b}$, in the same macromolecule. Such copolymers can be random copolymers or block copolymers. However, the homopolymeric compounds are preferred.

The components VII and VIII are used in approximately stoichiometric proportions. A small excess of component VII can be advantageous if it is desired to obtain products of relatively low molecular weight and with a low content of end groups Z of the formula VIII. However, it is also possible to carry out the polycondensation with a small excess of component VIII and to eliminate the end groups Z by after-treatment with a nucleophilic reagent, for example with an amine, an alkali metal alkoxide or an alkali metal hydride, or by after-treatment with a silver compound, for example silver nitrate, silver hydroxide or moist silver oxide.

The polycondensation can be carried out without a solvent or in inert organic solvents. Examples of suitable solvents are toluene, xylene, diethylene glycol dialkyl ethers or hydrogenated naphthalenes. Suitable bases are, in particular, alkali metal compounds, for example $Na_2CO_3$, $K_2CO_3$, $NaOC_2H_5$, $LiNH_2$ or LiH. Quaternary ammonium hydroxides are also suitable. It is preferred to use alkali metal carbonates. The reaction is carried out at elevated temperature, preferably at 60°–160° C.

When using bases which are insoluble in the reaction mixture, the reaction is substantially facilitated by the addition of phase-transfer catalysts, for example quaternary ammonium salts, crown ethers or non-cyclic neutral ligands such as polyethylene glycols and their ethers. Combinations of crown ethers and polyethylene glycols or their ethers are particularly effective, especially when using alkali metal carbonates as the base.

Alternatively, the compounds of the formula I can be prepared by first subjecting a dialkyl malonate or an alkyl cyanoacetate to a polycondensation reaction with a compound of the formula VIII and reacting the product with an alcohol or an amine of the formula $R^1YH$. A polymer-analogous transesterification or amidation of this type can be carried out with the stoichiometric amount (or an excess) of $R^1YH$ or with less than the stoichiometric amount. In the latter case, only a partial reaction takes place and this gives a copolymer having alkyl ester groups and $-CO-YR^1-$ groups next to one another. The reaction can also be carried out, stepwise or simultaneously, with two or three different reagents $-R^1YH$, $R^{1a}Y^aH$, $R^{1b}Y^bH-$ whereby copolymers of the formula I are again obtained.

These reactions can also be carried out in the absence or in the presence of solvents. Examples of suitable solvents are toluene, xylene, decalin or tetralin. In the reaction with alcohols, catalysts, such as those generally known for transesterification reactions, for example metal alcoholates, tetraalkyl orthotitanates and alkali metal amides, are preferably added. The reaction with amines can be accelerated by means of basic catalysts.

Both types of reactions are carried out at elevated temperature, preferably at 120°–180° C., under inert gas.

The introduction of the substituents $R^4$, $R^7$ and $R^9$ can also be carried out by a polymer-analogous reaction of a pre-formed polymer of the formula I in which $R^4$, $R^7$ or $R^9$ is hydrogen. The generally known methods for the N-substitution of secondary amines are used for this purpose. Thus, for example, alkyl, alkenyl, aralkyl or acyl radicals can be introduced by means of the corresponding halogen compounds. Cyanomethyl can be introduced by reaction with $CH_2O/HCN$, methyl by reaction with $CH_2O/HCOOH$ and the oxyl oxygen by reaction with peroxy compounds.

The molecular weight of the polymers of the formula I obtainable in this way can be as much as 50,000. For their use as stabilisers for polymers, however, the molecular weight should be 800 to 20,000, preferably 1,000–10,000 and particularly preferably 1,000–5,000.

The compounds of the formula I according to the invention are effective light stabilisers for organic polymers which are sensitive to light, in particular to UV light. Examples of such light-sensitive polymers are:

1. Polymers of monoolefins and diolefins, for example polyethylene (which may be crosslinked), polypropylene, polyisobutylene, polybut-1-ene, polymethylpent-1-ene, polyisoprene or polybutadiene, and polymers of cycloolefins, for example of cyclopentene or norbornene.

2. Mixtures of the polymers mentioned under (1), for example mixtures of polypropylene with polyethylene or with polyisobutylene.

3. Copolymers of monoolefins and diolefins with one another or with other vinyl monomers, for example ethylene/propylene copolymers, propylene/but-1-ene copolymers, propylene/isobutylene copolymers, ethylene/but-1-ene copolymers, propylene/butadiene copolymers, isobutylene/isoprene copolymers, ethylene/alkyl acrylate copolymers, ethylene/alkyl methacrylate copolymers, ethylene/vinyl acetate copolymers or ethylene/acrylic acid copolymers and their salts (ionomers), and terpolymers of ethylene with propylene and with a diene such as hexadiene, dicyclopentadiene or ethylidenenorbornene.

4. Polystyrene.

5. Copolymers of styrene or α-methylstyrene with dienes or acrylic derivatives, for example styrene/butadiene, styrene/acrylonitrile, styrene/ethyl methacrylate, styrene/butadiene/ethyl acrylate or styrene/acrylonitrile/methyl acrylate; high impact strength mixtures of styrene copolymers and of another polymer, for example a polyacrylate, a diene polymer or an ethylene/propylene/diene terpolymer; and block copolymers of styrene, for example styrene/butadiene/styrene, styrene/isoprene/styrene, styrene/ethylene-butylene/styrene or styrene/ethylene-propylene/styrene.

6. Graft copolymers of styrene, for example styrene grafted onto polybutadiene, styrene and acrylonitrile grafted onto polybutadiene, styrene and maleic anhydride grafted onto polybutadiene, styrene and alkyl acrylates or alkyl methacrylates grafted onto polybutadiene, styrene and acrylonitrile grafted onto ethylene/propylene/diene terpolymers, styrene and acrylonitrile grafted onto polyalkyl acrylates or polyalkyl methacrylates, or styrene and acrylonitrile grafted onto acrylate/butadiene copolymers, and their mixtures with the copolymers mentioned under (5), for example those known as so-called ABS, MBS, ASA or AES polymers.

7. Halogen-containing polymers, for example polychloroprene, chlorinated rubber, chlorinated or chlorosulfonated polyethylene, or epichlorohydrin homopolymers and copolymers, in particular polymers of halogen-containing vinyl compounds, for example polyvinyl chloride, polyvinylidene chloride, polyvinyl fluoride or polyvinylidene fluoride, and their copolymers such as vinyl chloride/vinylidene chloride, vinyl chloride/vinyl acetate or vinylidene chloride/vinyl acetate.

8. Polymers derived from $\alpha,\beta$-unsaturated acids and from their derivatives, such as polyacrylates and polymethacrylates, polyacrylamides and polyacrylonitriles.

9. Copolymers of the monomers mentioned under (8) with one another or with other unsaturated monomers, for example acrylonitrile/butadiene copolymers, acrylonitrile/alkyl acrylate copolymers, acrylonitrile/alkoxyalkyl acrylate copolymers, acrylonitrile/vinyl halide copolymers or acrylonitrile/alkyl methacrylate/butadiene terpolymers.

10. Polymers derived from unsaturated alcohols and amines or from their acyl derivatives or acetals, such as polyvinyl alcohol, polyvinyl acetate, stearate, benzoate or maleate, polyvinylbutyral, polyallyl phthalate or polyallylmelamine.

11. Homopolymers and copolymers of cyclic ethers, such as polyalkylene glycols, polyethylene oxide, polypropylene oxide or their copolymers with bis-glycidyl ethers.

12. Polyacetals such as polyoxymethylene, and polyoxymethylenes which contain comonomers, for example ethylene oxide.

13. Polyphenylene oxides and sulfides.

14. Polyurethanes derived from polyethers, polyesters and polybutadienes with terminal hydroxyl groups on the one hand and aliphatic or aromatic polyisocyanates on the other hand, and their precursors (polyisocyanates, polyols and prepolymers).

15. Polyamides and copolyamides derived from diamines and dicarboxylic acids and/or from aminocarboxylic acids or the corresponding lactams, such as polyamide-4, polyamide-6, polyamide-6,6, polyamide-6,10, polyamide-11, polyamide-12, poly-2,4,4-trimethylhexamethylene terephthalamide, poly-m-phenylene isophthalamide and their copolymers with polyethers, for example with polyethylene glycol, polypropylene glycol or polytetramethylene glycol.

16. Polyureas, polyimides and polyamide-imides.

17. Polyesters derived from dicarboxylic acids and diols and/or from hydroxycarboxylic acids or the corresponding lactones, such as polyethylene terephthalate, polybutylene terephthalate, poly-1,4-dimethylolcyclohexane terephthalate, poly-[2,2-bis-(4-hydroxyphenyl)-propane]terephthalate or polyhydroxybenzoates, and block polyether-esters derived from polyethers with hydroxyl end groups, dialcohols and dicarboxylic acids.

18. Polycarbonates.

19. Polysulfones and polyether-sulfones.

20. Crosslinked polymers derived from aldehydes on the one hand and phenols, urea or melamine on the other hand, such as phenol/formaldehyde, urea/formaldehyde and melamine/formaldehyde resins.

21. Drying and non-drying alkyd resins.

22. Unsaturated polyester resins derived from copolyesters of saturated and unsaturated dicarboxylic acids with polyhydric alcohols, and vinyl compounds as crosslinking agents, and also their halogen-containing, slow-burning modifications.

23. Crosslinkable acrylic resins derived from substituted acrylic acid esters, for example from epoxyacrylates, urethane-acrylates or polyester-acrylates.

24. Alkyd resins, polyester resins and acrylate resins crosslinked with melamine resins, urea resins, polyisocyanates or epoxide resins.

25. Crosslinked epoxide resins derived from polyepoxides, for example from bis-glycidyl ethers or from cycloaliphatic diepoxides.

26. Natural polymers such as cellulose, natural rubber and gelatine, and their derivatives chemically modified by a polymer-analogous reaction, such as cellulose acetates, propionates and butyrates, or the cellulose ethers such as methylcellulose.

Of particular importance is the stabilisation of polyolefins, styrene polymers, polyamides, polyurethanes and lacquering resins such as alkyd, acrylic and polyester resins.

The stabilisers according to the invention are added to the polymers in a concentration of 0.01 to 5% by weight, based on the material to be stabilised. Preferably, 0.1 to 2% by weight of the compounds, based on the material to be stabilised, is incorporated into the latter.

The incorporation can be carried out before, during or after the polymerisation, for example by mixing the compounds, and, if appropriate, further additives, into the melt by the methods customary in the art, before or during shaping, or by applying the dissolved or dispersed compounds to the polymer, if appropriate with subsequent evaporation of the solvent.

The stabilisers can also be added to the polymers to be stabilised in the form of a master batch, which contains these compounds, for example, in a concentration of 2.5 to 25% by weight.

The invention therefore also relates to the polymers stabilised by the addition of 0.01 to 5% by weight of a compound of the formula I, it being possible, if appropriate, for these polymers to contain further known and customary additives. The polymers stabilised in this way can be used in a wide variety of forms, for example as films, fibres, tapes or profiles or as binders for lacquers, adhesives or putties.

Examples of further additives together with which the stabilisers which can be used according to the invention can be employed are:

Antioxidants such as 2,6-dialkylphenols, alkylated hydroquinones, thio-bis-phenols, alkylidene-bis-phenols, O-, N- and S-hydroxybenzyl compounds, hydroxybenzylated malonic acid esters, hydroxybenzyl aromatic compounds, hydroxybenzyl-s-triazines, amides and esters of $\beta$-(3,5-di-tert.-butyl-4-hydroxyphenyl)-propionic acid, esters of $\beta$-(3,5-di-tert.-butyl-4-hydroxy-3-methylphenyl)-propionic acid, esters of 3,5-di-tert.-butyl-4-hydroxyphenylacetic acid, esters of hydroxybenzylphosphonic acids, acylaminophenols or aromatic amines, UV absorbers and light stabilisers such as 2-(2'-hydroxyphenyl)-benzotriazoles, 2-hydroxybenzophenones, 1,3-bis-(2'-hydroxybenzoyl)-benzenes, aryl esters of hydroxybenzoic acids, $\alpha$-cyanocinnamic acid derivatives, nickel compounds or sterically hindered amines or oxalic acid dianilides, metal deactivators, phosphites and phosphonites, compounds which destroy peroxides, basic co-stabilisers, PVC stabilisers, nucleating agents or other additives, for example plasticisers, lubricants, emulsifiers, fillers carbon black, asbestos, kaolin, talc, glass fibres, pigments, fluorescent brighteners, flameproofing agents and antistatic agents.

Examples of further additives together with which the stabilisers which can be used according to the invention can be employed are to be found on pages 18–24 of German Offenlegungsschrift No. 2,427,853.

With the concomitant use of known stabilisers, synergistic effects can occur, and this is frequently the case, especially with the concomitant use of UV absorbers.

The polymers according to the invention can also be used in the form of their complexes with heavy metal compounds, in particular nickel or cobalt compounds. Examples of these are complexes with nickel acetate, nickel stearate or nickel acetylacetonate.

The examples which follow illustrate the preparation of the polymers according to the invention and their use as light stabilisers. The temperatures indicated therein are given in °C.

EXAMPLE 1

20.53 g (0.05 mol) of bis-(1,2,2,6,6-pentamethyl-piperidin-4-yl)malonate, 13.19 g of α,α'-dibromo-p-xylene (0.05 mol), 14.5 g (0.105 mol) of finely powdered anhydrous potassium carbonate, 0.66 g of 18-crown-6 (1,4,7,10,13,16-hexaoxa-cyclooctadecane) and 1.6 g of polyethylene glycol 400 are heated at 140° for 43 hours, with efficient stirring and under a nitrogen atmosphere. For working-up, the cooled reaction melt is taken up in methylene chloride, the solution is filtered through a thin layer of kieselguhr (Hyflo) until the filtrate is clear, and the solvent is completely distilled off in vacuo. The residue is dissolved in 25 ml of butan-2-one and the solution is poured into 500 ml of water, with vigorous stirring, the polymeric compound precipitating out and the crown ether and the polyethylene glycol 400 remaining dissolved in the water. The aqueous phase is decanted, the polymeric precipitate is dissolved in methylene chloride and the solution is dried over sodium sulfate and filtered. The methylene chloride solution is concentrated to about 50–60 ml and the product is reprecipitated by pouring the concentrate into 500 ml of methanol, with rapid stirring. The precipitated colourless polymer is dried in a high vacuum. It has a softening point of about 110° and has the structure

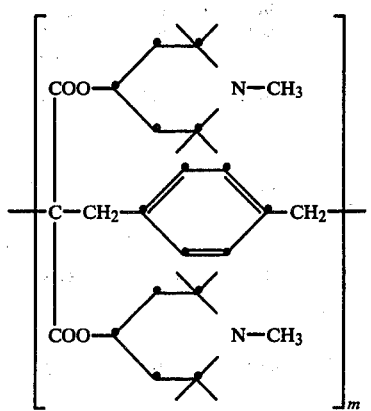

and an average molecular weight $\overline{M}n$ of 10,300, which corresponds to an average degree of polycondensation m=20.

$(C_{31}H_{48}N_2O_4)_m$ calculated: N 5.46%. $(512.67)_m$ found: N 5.3%. Bromine content: <0.1% of Br.

EXAMPLE 2

Analogously to Example 1, 20.53 g (0.05 mol) of bis-(1,2,2,6,6-pentamethyl-piperidin-4-yl)malonate and 11.61 g of α,α'-dibromo-p-xylene (0.044 mol), i.e. a molar ratio of about 9:8, are reacted with one another. This gives an oligomeric compound having a softening point of ~60° and an average molecular weight ($\overline{M}n$) of 2,000. This substance still had a residual bromine content of 0.8%. This residual bromine was removed as follows:

14.6 g of the oligomeric compound with a low bromine content are dissolved in 50 ml of dioxane, the solution is treated with 2 ml of a 1 N silver nitrate solution and the mixture is stirred at room temperature for 24 hours. The reaction solution is then filtered through a layer of Hyflo, the filtrate is freed of the dioxane in vacuo, the residue is dissolved in methylene chloride, the solution is washed four times with 25 ml of water and the oligomer is precipitated by pouring the methylene chloride solution into 300 ml of acetonitrile. The oligomeric compound thus obtained (formula cf. Example 1) is dried in a high vacuum. It is virtually free of halogen (content <0.1% of Br) and has a softening point of ~95° and an average molecular weight ($\overline{M}n$) of 2,540.

EXAMPLE 3

41.1 g (0.1 mol) of bis-(1,2,2,6,6-pentamethylpiperidin-4-yl)malonate, 21.9 g (0.09 mol) of 1,6-dibromohexane, 33.2 g (0.24 mol) of potassium carbonate, 1.32 g of 18-crown-6 and 1.67 g of tetrabutylammonium bisulfate, in 100 ml of anhydrous xylene, are heated at 110° for 70 hours, with sitrring and in a nitrogen atmosphere. The reaction mixture is then filtered, the filtrate is washed with three times 50 ml of water, the organic phase is dried over sodium sulfate and the solvent is distilled off in vacuo. The crude oligomeric compound is then further purified by repeated precipitation: it is first precipitated from a concentrated ethanol solution in 450 ml of ethanol/water (2:1 by volume) and then from a methylene chloride solution in 400 ml of acetonitrile, the liquid is decanted and the precipitated product is dried in a high vacuum. The oligomeric compound thus obtained has a softening point of about 60°, an average molecular weight ($\overline{M}n$) of 2,500 (corresponding to m=5) and a residual bromine content <0.1%.

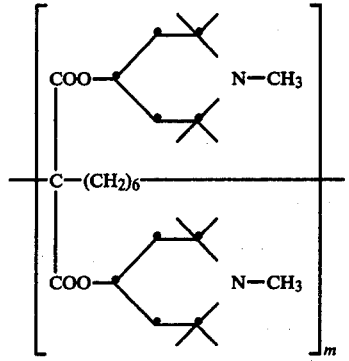

$(C_{29}H_{52}N_2O_4)_m$ calculated: N 5.68%. $(492.7)_m$ found: N 5.4%.

EXAMPLE 4

39.4 g (0.07 mol) of bis-(1-benzyl-2,2,6,6-tetramethyl-piperidin-4-yl)malonate, 20.7 g (0.063 mol) of 1,12-dibromododecane, 20.3 g of potassium carbonate, 0.93 g of 18-crown-6 and 3 g of polyethylene glycol methyl ether (molecular weight about 750) are heated at 130°-135° for 60 hours, with vigorous stirring. The reaction mixture, cooled to 80°, is then diluted with dichloroethane, the solution is filtered until the filtrate is clear, and the solvent is distilled off in vacuo. The residue is dissolved in about 100 ml of butan-2-one, the solution is poured into 800 ml of water, with vigorous turbine-stirring, the liquid is decanted from the precipitated product, the latter is dissolved in methylene chloride and the solution is dried over sodium sulfate. After concentration to about 100 ml, the methylene chloride solution is poured into 800 ml of methanol, with rapid stirring, the precipitated oligomer is separated off and washed with methanol and the compound thus obtained is dried in a high vacuum. It has a softening point of 50° and an average molecular weight ($\overline{M}n$) of 3,600, corresponding to an average degree of polycondensation m=5. The residual bromine content is <0.1%.

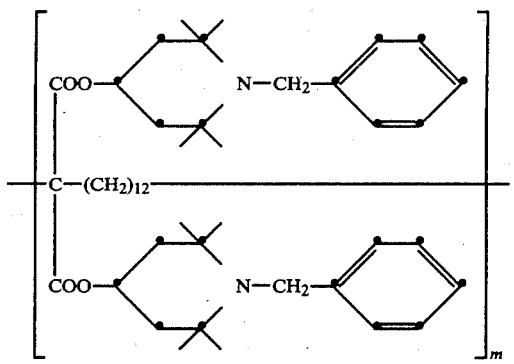

$(C_{47}H_{72}N_2O_4)_m$ calculated: N 3.84%. $(729.1)_m$ found: N 4.1%.

EXAMPLES 5-15

The oligomeric compounds listed in Table 1 were prepared analogously to Examples 1 or 4.

TABLE 1

Homopolymeric products of the formula

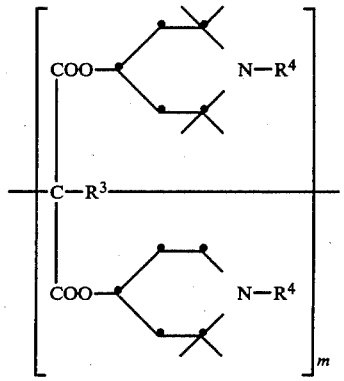

| Example | $R^3$ | $R^4$ | $T_s$* | $\overline{M}_n$ | Br content |
|---|---|---|---|---|---|
| 5 | —(CH$_2$)$_6$— | H | ~50° | 3,500 | <0.1% |
| 6 | —(CH$_2$)$_6$— | Benzyl | ~80° | 2,080 | <0.1% |
| 7 | —(CH$_2$)$_4$— | CH$_3$ | ~67° | 1,740 | 0.7% |
| 8 | —CH$_2$CH=CHCH$_2$— | CH$_3$ | ~75°-80° | 1,600 | <0.3% |
| 9 | —CH$_2$—〈phenyl〉—CH$_2$— | Benzyl | ~110° | 3,200 | 0.2% |
| 10 | —CH$_2$—〈biphenyl〉—CH$_2$— | CH$_3$ | ~130° | 3,600 | 0.3% |
| 11 | —CH$_2$—〈phenyl〉—CH$_2$— | H | ~190° | 5,000 | <0.1% |
| 12 | —(CH$_2$)$_{12}$— | CH$_3$ | ~20° (resin) | 11,000 | <0.1% |
| 13 | —CH$_2$—〈phenyl〉—CH$_2$— | COCH$_3$ | ~30° | 2,000 | <0.1% |
| 14 | —(CH$_2$)$_6$— | COCH$_3$ | ~45°-50° | 3,100 | <0.1% |
| 15 | —CH$_2$—〈phenyl〉—CH$_2$— | Allyl | ~145° | 2,020 | <0.1% |

*softening temperature

EXAMPLES 16-18

Analogously to Example 1, 30.7 g (0.07 mol) of bis-[2-(2,2,6,6-tetramethyl-piperidino)-ethyl]malonate are reacted with 16.42 g (0.062 mol) of α,α-dibromo-p-xylene, an oligomer of the formula

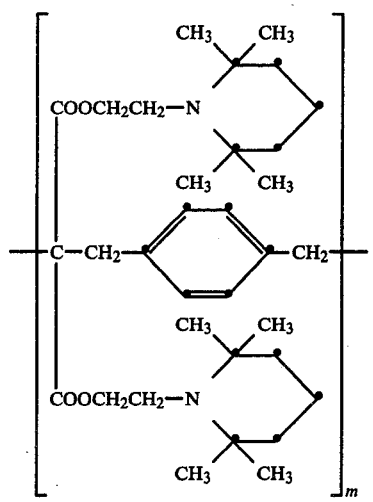

being obtained which has a softening point of 72°–75° C. and a bromine content of <0.1%. The average molecular weight $\overline{M}n$ is 3,300.

The following were obtained analogously:

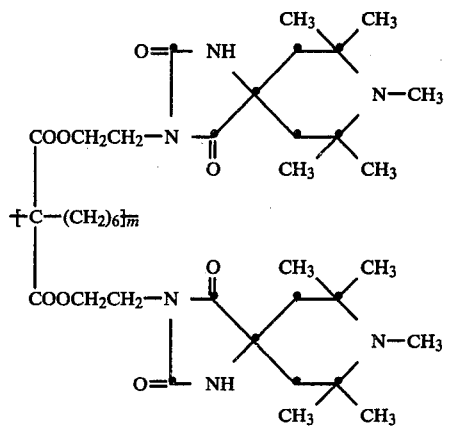

Example 17

Softening temperature ($T_s$) about 50°, $\overline{M}n$ 2,100.

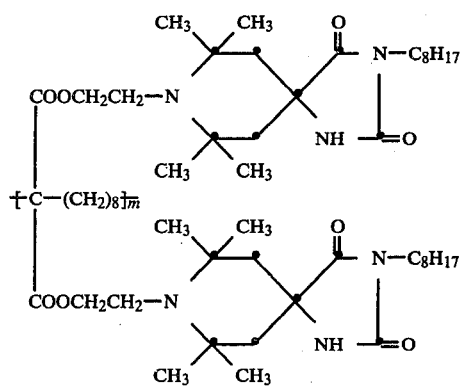

Example 18

Softening temperature ($T_s$) 68°, $\overline{M}n$ 3,900.

EXAMPLES 19 AND 20

Analogously to Example 1, 0.1 mol of N,N'-di-(1,2,2,6,6-pentamethylpiperidin-4-yl)-malonamide is reacted with 0.1 mol of 1,8-dibromooctane to give the oligomer of the formula

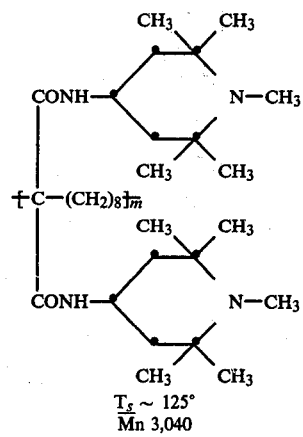

Example 19

$T_s \sim 125°$
$\overline{M}n$ 3,040 and with 0.1 mol of p-xylylene dibromide to give the oligomer of the formula

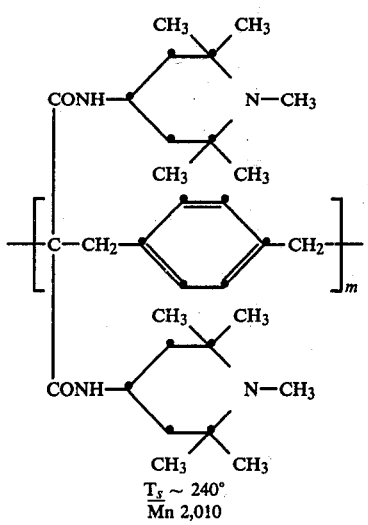

Example 20

$T_s \sim 240°$
$\overline{M}n$ 2,010

EXAMPLES 21 AND 22

Analogously to Example 1, 0.06 mol of (1-benzyl-2,2,6,6-tetramethylpiperidin-4-yl)cyanoacetate is reacted with 0.06 mol of 1,12-dibromodecane to give the oligomer of the formula

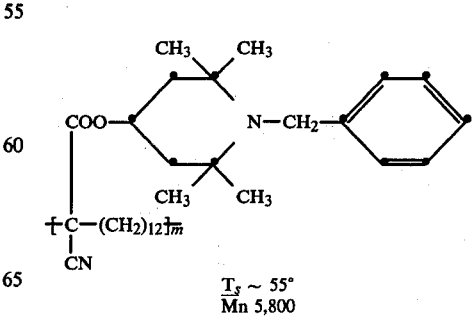

Example 21

$T_s \sim 55°$
$\overline{M}n$ 5,800

The oligomer of the formula

Example 22

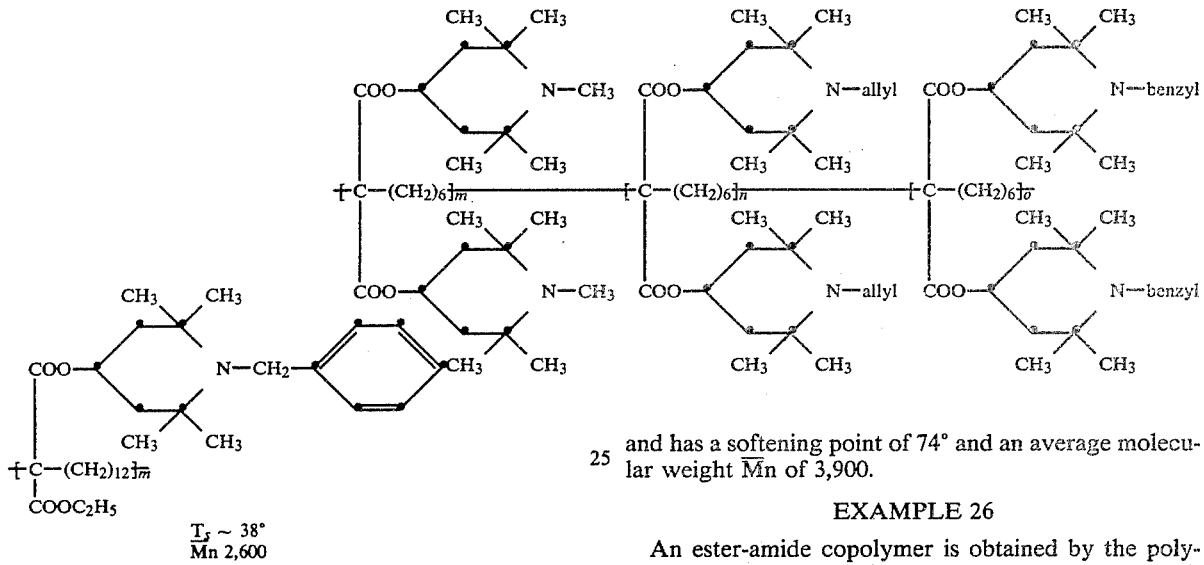

is obtained analogously from (1-benzyl-2,2,6,6-tetramethylpiperidin-4-yl)ethyl malonate, and 1,12-dibromododecane.

EXAMPLES 23 AND 24

Analogously to Example 1, a mixture of 0.02 mol of bis-(1,2,2,6,6-pentamethylpiperidin-4-yl)malonate and 0.04 mol of bis-(1-benzyl-2,2,6,6-tetramethylpiperidin-4-yl)malonate is reacted with 0.06 mol of 1,6-dibromohexane. This gives an oligomer of the formula

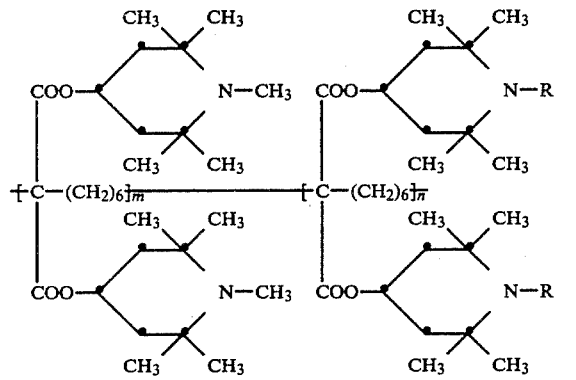

in which R=benzyl, with a ratio m:n=0.5. It has a softening point of 74° and an average molecular weight ($\overline{Mn}$) of 2,450. The residual bromine content is <0.3%.

An oligomer of the above formula in which R=allyl and the ratio m:n=2 is obtained analogously from 0.04 mol of bis-(1,2,2,6,6-pentamethylpiperidin-4-yl)malonate and 0.02 mol of bis-(1-allyl-2,2,6,6-tetramethylpiperidin-4-yl)malonate. $T_s$25°, $\overline{Mn}$ 4,300 (Example 24).

EXAMPLE 25

An oligomer with three different molecular units is obtained by the polycondensation of a mixture of 0.04 mol of bis-(1,2,2,6,6-pentamethylpiperidin-4-yl)malonate, 0.04 mol of bis-(1-allyl-2,2,6,6-tetramethylpiperidin-4-yl)malonate and 0.04 mol of bis-(1-benzyl-2,2,6,6-tetramethylpiperidin-4-yl)malonate with 0.12 mol of 1,6-dibromohexane.

The product corresponds to the formula and has a softening point of 74° and an average molecular weight $\overline{Mn}$ of 3,900.

EXAMPLE 26

An ester-amide copolymer is obtained by the polycondensation of a mixture of 0.05 mol of bis-(1,2,2,6,6-pentamethylpiperidin-4-yl)malonate and 0.05 mol of N,N'-di-(1,2,2,6,6-pentamethylpiperidin-4-yl)malonate with 0.1 mol of 1,6-dibromohexane by the method described in Example 1.

The product corresponds to the formula

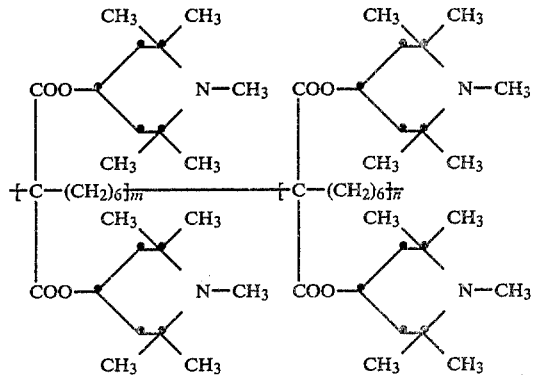

and has a softening point of 115° and an $\overline{Mn}$ of 3,050.

EXAMPLES 27 AND 28

112.5 g (0.7 mol) of diethyl malonate, 151.3 g (0.63 mol) of 1,6-dibromohexane, 203 g of finely powdered anhydrous potassium carbonate, 4 g of 18-crown-6 and 7.5 g of distilled polyethylene glycol dimethyl ether (Mn ≈500) are heated at 130° C. for 35 hours, with efficient stirring (anchor stirrer made of V₄A stainless steel) and under an N₂ atmosphere. For working-up, the virtually colourless reaction melt is diluted with methylene chloride, after cooling, the solution is filtered until the filtrate is clear, and the solvent is completely distilled off in vacuo. The residue is dissolved in about 100 ml of diethyl ether and the solution is poured slowly into 1 liter of n-hexane, with vigorous turbine-stirring. The precipitated oily oligomeric malonic acid ester is separated off, washed with hexane and completely freed of the solvent in a high vacuum. The oligomeric diethyl malonate thus obtained, which has the structure

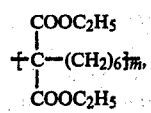

is a light yellow oil and has an $\overline{M}n$ of 1,450, which corresponds to an average degree of polycondensation $m=6$. The $^{13}C$ NMR spectrum corresponds to the structure shown.

10.9 g of this product are transesterified with 22.3 g of 1-benzyl-2,2,6,6-tetramethylpiperidin-4-ol in 300 ml of xylene, in the presence of 0.2 ml of tetrabutyl orthotitanate as a catalyst, with stirring, in a gentle $N_2$ stream, at 130°–145°, the ethanol which has been split off, together with some xylene, being distilled off continuously through the descending condenser over 24 hours. After the transesterification has ended, the reaction mixture is dissolved in a small amount of methylene chloride and the solution is poured slowly into 500 ml of methaol, with vigorous turbine-stirring, at 0°, whereby the oligomeric ester is precipitated. The methanol is separated off and the precipitate is washed with fresh methanol and completely dried in a high vacuum at about 40° C. The oligomeric ester thus obtained, which has the formula

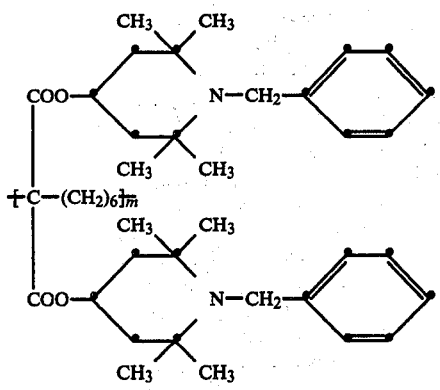

has a softening point of about 70° and an $\overline{M}n$ of 2,400. Its properties are similar to those of the product of Example 6, which has the same structure.

A product of the formula

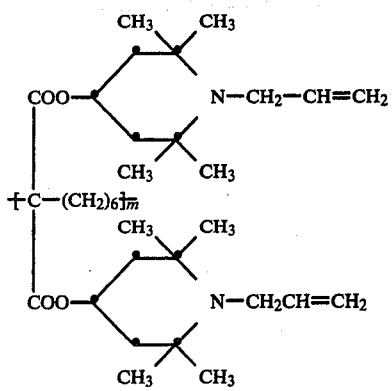

which has a softening point of 30° and an $\overline{M}n$ of 3,200 (Example 28), was prepared analogously from the oligomeric diethyl malonate by reaction with 1-allyl-2,2,6,6-piperidin-4-ol.

EXAMPLE 29 LIGHT STABILISATION OF POLYPROPYLENE 100 parts of polypropylene powder (Moplen, Fibre grade, from Montedison) are homogenised with 0.2 part of octadecyl β-(3,5-di-tert.-butyl-4-hydroxyphenyl)-propionate, 0.1 part of calcium stearate and 0.25 part of a light stabiliser from Table 2 below, in a Brabender Plastograph, at 200° C., for 10 minutes. The composition thus obtained is removed from the kneader as quickly as possible and compressed in a toggle press to form a 2–3 mm thick plate. Part of the blank obtained is cut out and compressed between two highly polished hard aluminium foils with a hydraulic laboratory handpress, for 6 minutes, at 260° C., to form a 0.1 mm thick film, which is immediately quenched in cold water. Sections are the stamped out of this film and exposed in a Xenotest 1200. At regular intervals of time, these test-pieces are removed from the exposure apparatus and tested in an IR spectrophotometer for their carbonyl content. The increase in the carbonyl extinction at 5.85 μm during exposure is a measure of the photooxidative degradation of the polymer (cf. L. Balaban et al., J. Polymer Sci., Part C; 22, 1,059–1,071 (1969)) and experience shows that it is related to the deterioration in the mechanical properties of the polymer. The time taken to reach a carbonyl extinction of about 0.3, at which the film is brittle, is a measure of the stabilising action. For a comparison film not containing light stabiliser, this exposure time is about 900 hours.

| Light stabiliser Example No. | Exposure time in hours |
|---|---|
| 1 | 3,660 |
| 2 | >5,500 |
| 3 | 5,000 |
| 4 | >4,600 |
| 5 | 4,490 |
| 6 | 5,450 |
| 7 | >5,300 |
| 8 | >4,600 |
| 9 | 4,130 |
| 10 | 2,430 |
| 11 | >4,300 |
| 12 | >4,400 |
| 13 | 3,200 |
| 14 | >4,200 |
| 15 | >4,200 |
| 16 | >4,400 |
| 17 | >4,200 |
| 20 | >3,000 |
| 24 | >3,000 |
| 28 | >3,200 |

What is claimed is:

1. A polymer or oligomeric compound of the general formula I

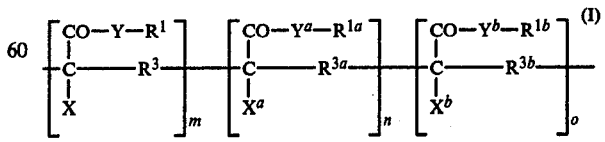

and its salts, in which X is —CO—Y—R² or —CN, $X^a$ is —CO—$Y^a$—$R^{2a}$ or —CN, and $X^b$ is —CO—$Y^b$—$R^{2b}$ or —CN, Y, $Y^a$ and $Y^b$ independently of one another are —O— or —NR$^{10}$—, R$^1$, R$^{1a}$ and R$^{1b}$ independently of one another are a group of the formulae II, III, IV, V or VI

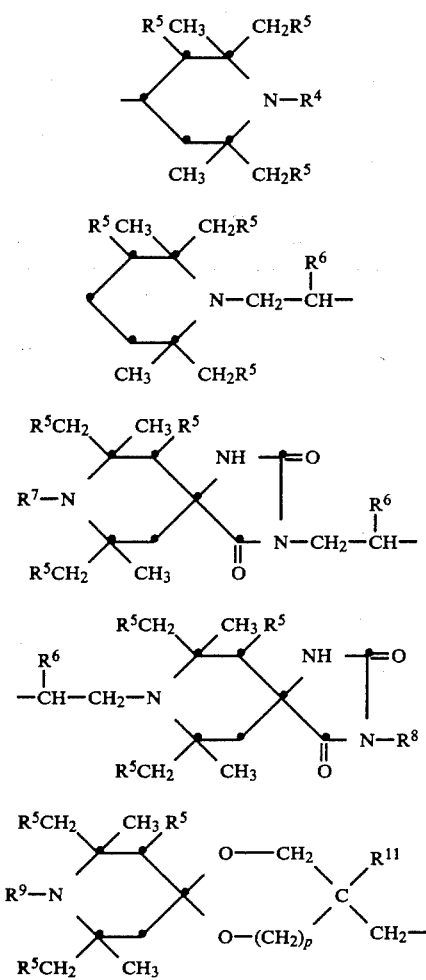

and R$^{1a}$ is also C$_1$–C$_{18}$-alkyl, R$^2$ is identical to R$^1$ or is H, C$_1$–C$_{18}$-alkyl, C$_3$–C$_7$-alkenyl or C$_7$–C$_{11}$-aralkyl, R$^{2a}$ is identical to R$^{1a}$ or is H, C$_1$–C$_{18}$-alkyl, C$_3$–C$_7$-alkenyl or C$_7$–C$_{11}$-aralkyl, and R$^{2b}$ is identical to R$^{1b}$ or is H, C$_1$–C$_{18}$-alkyl, C$_3$–C$_7$-alkenyl or C$_7$–C$_{11}$-aralkyl, R$^3$, R$^{3a}$ and R$^{3b}$ independently of one another are C$_2$–C$_{36}$-alkylene, C$_4$–C$_{18}$-alkenylene, C$_8$–C$_{20}$-arylene-dialkylene, C$_8$–C$_{12}$-cycloalkylene-dialkylene or C$_4$–C$_{20}$-monooxaalkylene or polyoxa-alkylene, R$^4$ is hydrogen, C$_1$–C$_{18}$-alkyl, C$_3$–C$_{18}$-alkenyl, C$_3$–C$_5$-alkynyl, C$_2$–C$_{18}$-alkanoyl, C$_3$–C$_5$-alkenoyl, benzoyl, unsubstituted or C$_1$–C$_4$-alkyl-substituted C$_7$–C$_{11}$-aralkyl, cyanomethyl, a group —CH$_2$—CH(OH)—R$^6$, OH, O.(oxyl oxygen), —COOC$_1$–C$_4$-alkyl or —CON(R$^{12}$) (R$^{13}$), R$^5$ is hydrogen or C$_1$–C$_4$-alkyl, R$^6$ is hydrogen, C$_1$–C$_4$-alkyl, phenyl, C$_1$–C$_4$-alkoxy-methyl, phenoxymethyl or C$_1$–C$_4$-alkyl-phenoxymethyl, R$^7$ is hydrogen, C$_1$–C$_{18}$-alkyl, C$_3$–C$_{18}$-alkenyl, C$_3$–C$_5$-alkynyl, C$_2$–C$_{18}$-alkanoyl, C$_3$–C$_5$-alkenoyl, unsubstituted or C$_1$–C$_4$-alkyl-substituted C$_7$–C$_{11}$-aralkyl, O. or cyanomethyl, R$^8$ is C$_1$–C$_{18}$-alkyl, C$_3$–C$_{18}$-alkenyl, C$_3$–C$_5$-alkynyl or C$_7$–C$_{11}$-aralkyl, R$^9$ has one of the definitions given for R$^7$, R$^{10}$ is hydrogen, C$_1$–C$_{18}$-alkyl, C$_3$–C$_{12}$-alkenyl, cyclohexyl or unsubstituted or C$_1$–C$_4$-alkyl-substituted C$_7$–C$_{11}$-aralkyl or C$_6$–C$_{12}$-aryl, R$^{11}$ is hydrogen or C$_1$–C$_4$-alkyl, R$^{12}$ is C$_1$–C$_{12}$-alkyl, C$_3$–C$_5$-alkenyl, C$_5$–C$_8$-cycloalkyl, phenyl or benzyl, and R$^{13}$ is hydrogen, C$_1$–C$_{12}$-alkyl, C$_3$–C$_5$-alkenyl, C$_5$–C$_8$-cycloalkyl or benzyl, or R$^{12}$ and R$^{13}$, together with the N atom to which they are bonded, form a 5–7-membered heterocyclic ring, m, n and o independently of one another are zero or a number from 1 to 100, the sum of m+n+o being at least 3, and p is zero or 1.

2. A compound, according to claim 1, of the formula I in which m and n are zero or a number from 1 to 30 and o is zero, the sum of m+n being at least 3, X is —CO—Y—R$^2$ and X$^a$ is —CO—Y$^a$—R$^{2a}$, Y and Y$^a$ are —O— or —NR$^{10}$—, R$^1$ and R$^{1a}$ are a group of the formula II, III, IV or V and R$^{1a}$ is also C$_1$–C$_8$-alkyl, R$^2$ is identical to R$^1$ or is C$_1$–C$_6$-alkyl, and R$^{2a}$ is identical to R$^{1a}$ or is C$_1$–C$_6$-alkyl, R$^3$ and R$^{3a}$ are C$_2$–C$_{18}$-alkylene, C$_4$–C$_{12}$-alkenylene, C$_8$–C$_{17}$-arylenedialkylene, C$_8$–C$_{10}$-cycloalkylene-dialkylene or C$_4$–C$_8$-monooxaalkylene or C$_4$–C$_8$-polyoxaalkylene, R$^4$ is hydrogen, C$_1$–C$_6$-alkyl, C$_3$–C$_5$-alkenyl, propargyl, C$_2$–C$_5$-alkanoyl, C$_3$–C$_5$-alkenoyl or C$_7$–C$_{11}$-aralkyl, R$^5$ is hydrogen, R$^6$ is hydrogen, C$_1$–C$_2$-alkyl, phenyl or phenoxymethyl, R$^7$ has one of the definitions given for R$^4$, R$^8$ is C$_1$–C$_{12}$-alkyl, c$_3$–C$_5$-alkenyl or C$_7$–C$_{11}$-aralkyl, R$^9$ has one of the definitions given for R$^4$, and R$^{10}$ is hydrogen, C$_1$–C$_{12}$-alkyl, benzyl or cyclohexyl.

3. A compound, according to claim 2, of the formula I in which m is 3–20, n and o are zero, R$^1$ and R$^2$ are a group of the formula II, R$^3$ is C$_6$–C$_{12}$-alkylene, 1,4-but-2-enylene, xylylene or cyclohexane-dimethylene, R$^4$ is hydrogen, C$_1$–C$_4$-alkyl, allyl, benzyl or acetyl, and X, Y, R$^5$ and R$^{10}$ are as defined in claim 2.

4. An organic polymer stabilised against damage by the action of light, containing, as the light stabiliser, 0.01 to 5% by weight, preferably 0.1 to 2% by weight, of a compound of the formula I, according to claim 1.

* * * * *